United States Patent Office 3,715,153
Patented Feb. 6, 1973

3,715,153
SINGLE-WING LIGHT CHOPPER FOR INFRARED GAS ANALYZERS
Gunter Schunck, Karlsruhe, Winfried Speeter, Herxheim, and Albert Randow, Karlsruhe, Germany, assignors to Siemens Aktiengesellschaft, Erlangen, Germany
Filed Oct. 26, 1971, Ser. No. 192,103
Claims priority, application Germany, Oct. 27, 1970, P 20 52 609.4
Int. Cl. G02f 1/30; G01n 21/24; G01d 5/36
U.S. Cl. 350—273
6 Claims

ABSTRACT OF THE DISCLOSURE

Between a light source and the inlet opening of a beam splitter of the type associated with an infrared gas analyzer there is disposed a single-wing rotary shutter provided with a sole blocking edge and a sole opening edge and is driven by a commutatorless D.C. motor. The axis of rotation of the shutter is arranged parallel with the symmetry axis of the beam splitter and spaced from the symmetry plane thereof.

BACKGROUND OF THE INVENTION

This invention relates to a light chopper, including a motor and a rotary shutter, for application particularly in an infrared gas analyzer in which the measuring beam and the reference beam are generated by the same infrared light source.

Infrared gas analyzers are known wherein a separate infrared light beam traverses a measuring chamber filled with a gas specimen and a reference chamber filled with reference gas. The two light beams which are generated in two identical infrared light sources pass through a light chopper in which they are periodically interrupted by means of a rotating shutter driven by a motor. As a result, the measuring signal oscillates periodically with the frequency of the rotating shutter. A periodic measuring signal is desirable for the purpose of obtaining a high degree of sensitivity of the measuring process.

In infrared gas analyzers known heretofore, such as disclosed, for example, in German published patent application DOS 1,947,753 there is provided a light chopper wherein the drive shaft of the rotary shutter is situated between the measuring chamber and the reference chamber and parallel to the two chamber axes. The shutter is formed of two oppositely disposed circular sectors. The two blocking and opening edges of the rotary shutter are linear and both chambers are, according to the angular position of the shutter, always simultaneously traversed by the infrared light and simultaneously entirely or partially darkened. For each full revolution of the rotary shutter, the light beams are interrupted twice in both chambers. In the known light choppers the rotary shutter is usually driven by a synchronous motor (with or without a reduction gear) supplied with the customary line frequency of 50 cycles.

A light chopper of the aforenoted known type has several disadvantages particularly in the course of a transition to a higher measuring sensitivity of the infrared gas analyzer. Thus, it was found that the intensities of the infrared light beams entering the measuring chamber and the reference chamber are not identical at any given moment during one full revolution, particularly when the zero light intensity in the two chambers is about to be reached. The reason for this phenomenon is the fact that the two light beams are interrupted by the two separate circular sectors of the shutter and that their symmetrical disposition with respect to the rotary axis of the shutter can be manufactured only with certain tolerances. The consequence of the two non-identical intensities at the same moment is a relatively large upper harmonic in the measuring signal which distorts the results of the measurements particularly in case of a high degree of detection sensitivity of the gas analyzer.

It is a further disadvantage of the known light choppers that a synchronous motor is used for driving the shutter. Although a synchronous motor is of simple construction and hence economical, the maximum moment of inertia permissible for its drive shaft is very small. Therefore, since the rotary shutter cannot be arbitrarily light and, in addition, it has a relatively large diameter, often significant difficulties in starting are experienced. Such difficulties may be eliminated by means of a soft coupling and thus only to the detriment of an inphase relationship between the angular position of the rotary shutter and the phase angle of the line frequency.

A slowly rotating synchronous motor has a further disadvantage. Because of its multiple arrangement, the drive shaft does not execute one full revolution during one cycle of the line frequency. It rotates only through an angle which is determined by the number of the pole pairs. Consequently, the angular position of the shutter is not equivocally correlated to the frequency of the A.C. voltage applied. For this reason the use of a synchronous motor with a phase-controlled rectificaton of the measuring signal has necessitated the use of a position indicator (photocell or magnetic sensor) for the shutter. Such position-indicator devices, however, are relatively expensive. The accuracy of the phase signals transmitted thereby is inherently limited by the axial play of the rotary shutter.

A further disadvantage of a synchronous motor used as the drive motor for a shutter in an infrared gas analyzer resides in the dependency of its r.p.m. from the line frequency. This necessitates the use of different adaptor means for the gas analyzer for the different line frequencies (for example, 50 cycles and 60 cycles). Also, it is desirable to permit a setting of the light chopper to different r.p.m.'s. Measurements have shown that the maximum sensitivity of an infrared gas analyzer for any given gas to be analyzed is dependent upon the r.p.m. of the rotary shutter. Because of the use of a synchronous motor, an adjustment of the r.p.m. has been heretofore possible only if expensive gearing was incorporated.

OBJECT AND SUMMARY OF THE INVENTION

It is an object of the invention to provide an improved light chopper for an infrared gas analyzer in which the aforelisted disadvantages are eliminated.

Briefly stated, according to the invention, the rotary shutter is formed as a half-wing disc with a curved blocking edge and a curved opening edge and is situated in the common beam path upstream (i.e. in front) of a beam splitter. Further, the rotary axis of the shutter is arranged parallel to the line of symmetry of the said beam splitter, but externally of the plane of symmetry thereof. The blocking edge and the opening edge may be of elliptical configuration. For the purpose of simplifying the structure of the light chopper, the angle between a line along the distance from the rotary axis of the shutter to the symmetry line of the light chopper and the symmetry plane thereof is approximately 45°.

The invention will be better understood as well as further objects and advantages become more apparent from the ensuing detailed specification of a preferred although exemplary embodiment taken in conjunction with the drawing.

DESCRIPTION OF THE PREFERRED EMBODIMENT

Figure 1:
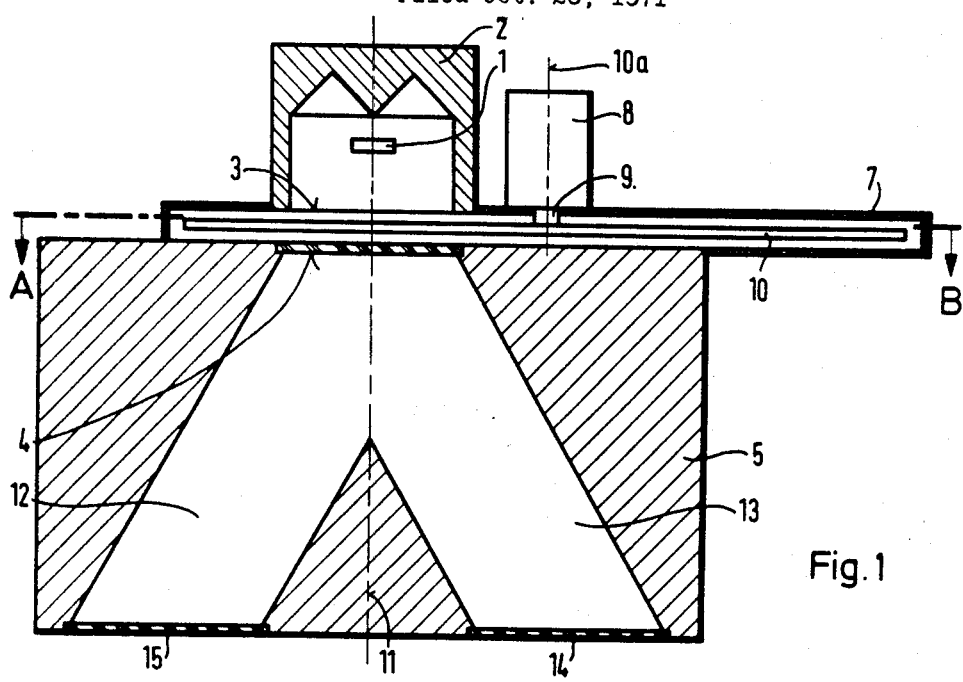
FIG. 1 is a longitudinal sectional view through one part of an infrared gas analyzer incorporating the preferred embodiment of the invention and FIG. 2 is a view along line A–B of FIG. 1.
Figure 2:
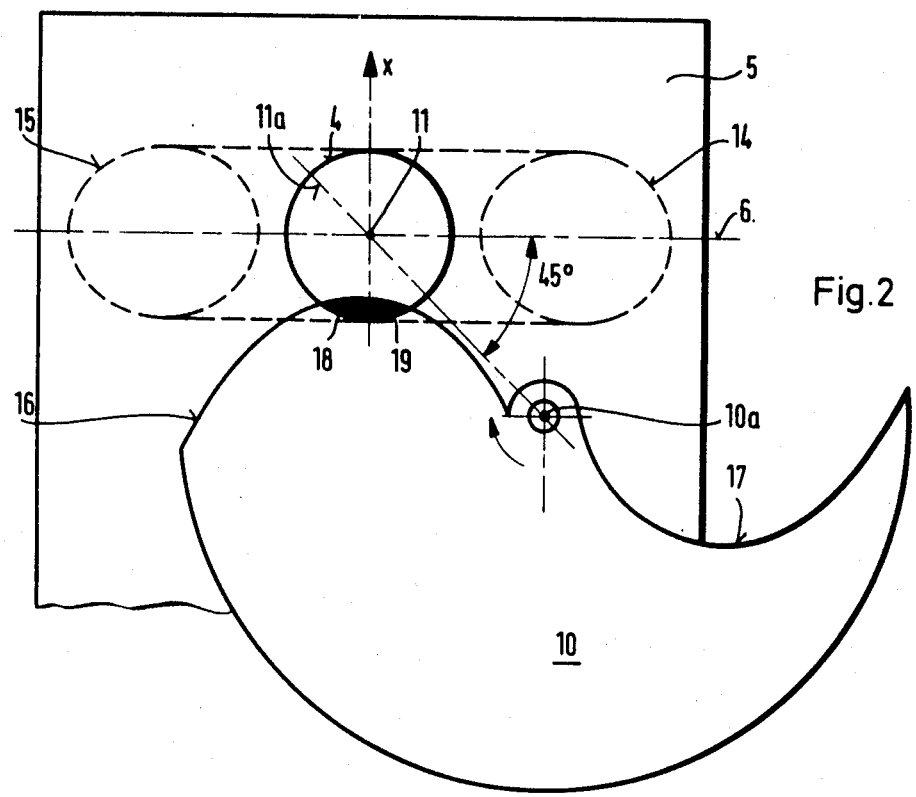

Turning now to FIG. 1, the measuring beam and the reference beam of an infrared gas analyzer are generated by the same infrared light source 1. As already described in German patent application Ser. No. P 16 98 261.9, the infrared light source 1 is situated in a reflector housing 2, the light outlet 3 of which is arranged in front of an infrared light pervious window 4 covering the inlet opening of a tubular beam splitter 5. FIG. 1 shows a longitudinal section through the reflector housing 2 and the beam splitter 5. The plane of symmetry which is indicated at 6 in FIG. 2 lies in the plane of the drawing in FIG. 1. The reflector housing 2 and the beam splitter 5 are connected with one another by a housing 7 which may be filled with a protective gas. Adjacent the reflector housing 2 there is supported a motor 8, the drive shaft 9 of which projects in a gas-tight manner into the housing 7 and drives a rotary shutter 10 situated in the housing 7. The axis of rotation 10a of the shutter 10 coincides here with the axis of the drive shaft 9 of the motor 8. The rotary axis 10a is spaced parallel with respect to the axis of symmetry 11 (FIG. 1) and with respect to the plane of symmetry 6 (FIG. 2). As it may be further observed from FIG. 2, the angle between a line 11a extending along the distance from the rotary axis 10a of the shutter 10 to the symmetry line 11 (and being normal to both lines 10a and 11) and the symmetry plane 6 is approximately 45°. This arrangement permits a simple structure of the shutter 10.

The light beam emanating from the infrared light source 1 is, subsequent to its passage through the housing 7 and the window 4, divided into a measuring light beam which passes through the measuring channel 12 of the beam splitter 5 and into a reference light beam which passes through the reference channel 13. Both light beams leave the beam splitter 5 through infrared-pervious windows 14 and 15, respectively. Thereafter, the light beams are directed into respective measuring and reference chambers (neither shown) in which the gas specimen and the reference gas are contained.

As shown in FIG. 2, the rotary shutter 10 is formed as a single-wing disc. In this manner the tolerance effects relating to the symmetry of a conventional two-wing shutter disc are eliminated. During rotation, the shutter enters periodically the common beam path between the light outlet opening 3 and the window 4. The rotary shutter 10 may be made of aluminum; the diameter of its semicircular periphery is, for example, 111 mm., while its thickness is, for example, 0.4 mm. It has a sole blocking edge 16 and a sole opening edge 17, both being of curved configuration. Its direction of rotation is indicated by the arrow at the rotary axis 10a (FIG. 2).

The shape of the curve constituting the blocking edge 16 and that of the curve constituting the opening edge 17 are chosen in such a manner (while taking into account the geometry of the arrangement) that during the rotation of the rotary shutter 10 both halves of the window 4 (as divided by a plane which is normal to the symmetry plane 6 and which contains the symmetry axis 11) are simultaneously opened for the passage of the infrared light and, are simultaneously entirely or partially blocked. Stated in different terms, for any given angular position of the shutter 10, the blocked and non-covered areas of one-half of window 4 are identical to the respective blocked and on-covered areas of the other half of window 4. Since the blocking edge 16 and the opening edge 17 have the same curved configuration, the measuring channel 12 and the reference channel 13 receive identical light quantities at each moment both during the beginning of the blocking phase when the blocking edge 16 enters in front of the window 4 and during the beginning of the opening phase when the opening edge 17 passes in front of the window 4.

In FIG. 2 the rotary shutter 10 is shown in an angular position in which the covering edge 16 has just entered the common beam path (blocking step. The blocked left half 18 (shown hatched) of the window 4 is of the same area as the blocked right half 19 (also shown hatched) of the window 4, so that in the measuring channel 12 and the reference chamber 13 identical light quantities enter. Also, as the blocking step progresses, that is, upon further rotation of the rotary shutter 10 in the direction of the arrow, the covered left half 18 and the covered right half 19 of the window 4 will always be of equal area. Stated in different terms, the center of gravity of the blocked and non-blocked areas of the window 4 is situated at all times on the axis x as shown in FIG. 2. This axis lies in the aforedefined plane that halves the area of window 4.

The curvilinear configuration of the blocking edge 16 and the opening edge 17 may be determined experimentally or by calculations. It has been found that an elliptical configuration of those portions of the two edges 16 and 17 that enter the common beam path ensures a sufficiently accurate equality of the areas of the blocked portions 18 and 19 and thus an identical light intensity at any given moment in the two channels 12 and 13 is ensured. The direction of rotation of the motor 8 may be reversed, whereby the edges 16 and 17 exchange roles.

The drive motor 8 is preferably a commutatorless D.C. motor which is in a large measure free from limitations regarding the magnitude of the moment of inertia which the rotary shutter 10 may have. Its r.p.m. is maintained at a constant value by means of a matched electronic r.p.m. control. It is a particular advantage of the structure described that the r.p.m. may be freely chosen between wide limits without the necessity of any mechanical change in the completed structure of the light chopper. Thus, for any gas to be analyzed, the optimal sensitivity of the gas analyzer may be set.

It is a further advantage of the use of a commutatorless D.C. motor that it has only one pole pair and thus the angular position of the shutter can be unequivocally determined, in contradistinction to multipole motors used in prior art devices. The voltage induced in the windings of the commutatorless D.C. motor is an accurate and unequivocal measure for the angular position of the rotary shutter 10 provided the latter is keyed to the drive shaft 9 without an elastic coupling. Thus, zero values of this voltage may be used by means of an electric comparator to control a phase-sensitive rectifier for the measuring signal. A phase adjustment, should it become necessary, can be easily effected by turning the motor housing—containing the stator with its winding—relative to the motor axis. Due to the rigid coupling of the motor shaft with the rotary shutter, the aforenoted turning of the motor housing also results in a change of the angle with respect to the axis 11. Stated differently, the motor housing may be turned about its axis in such a manner that to a very accurately determined angular position of the rotary shutter there corresponds a zero passage (momentary zero value) of the voltage induced in the stator windings. Thus, the use of an additional position sensor at the rotary shutter 10 is unnecessary when the drive means is a commutatorless D.C. motor.

What is claimed is:

1. In a light chopper particularly of the type associated with an infrared gas analyzer, the latter including (a) a light source for generating a light beam, (b) a beam splitter for dividing said light beam into a measuring beam and a reference beam, said beam splitter having a symmetry axis and a symmetry plane containing said axis, the improvement comprising
   (A) a rotary shutter disposed between said light source and said beam splitter and having an axis of rotation spaced from said symmetry plane and parallel with said symmetry axis, said rotary shutter being formed as a single-winged disc having a sole blocking edge and a sole opening edge, both edges being of curvilinear configuration and
   (B) motor means for rotating said rotary shutter to periodically interrupt said light beam by causing said single-winged disc to be periodically introduced into and withdrawn from the path of said light beam.

2. An improvement as defined in claim 1, wherein both said blocking edge and said opening edge have an elliptical shape.

3. An improvement as defined in claim 1, wherein the angle between said symmetry plane and a line normal to both said axes is 45°.

4. An improvement as defined in claim 1, wherein said motor means is constituted by a commutatorless D.C. motor.

5. An improvement as defined in claim 4, including a comparator and a phase-responsive rectifier; the voltage induced in the windings of said motor being applied to said rectifier through said comparator.

6. An improvement as defined in claim 1, said beam splitter having an inlet opening defining the cross sectional area of said path, the geometrical relationship between said single-winged disc and said inlet opening being such at any angular position of said rotary shutter that the blocked portion and the non-blocked portion of one half of said inlet opening being at all times identical to the respective blocked portion and non-blocked portion of the other half of said inlet opening, said halves being obtained by an imaginary halving plane which is normal to said symmetry plane and which contains said symmetry axis.

References Cited

UNITED STATES PATENTS 2,844,729   7/1958   Winterling et al. ___ 250—43.5 R

RONALD L. WIBERT, Primary Examiner

V. P. McGRAW, Assistant Examiner

U.S. Cl. X.R.

250—43.5 R, 233; 356—51